(12) United States Patent
Sharma

(10) Patent No.: US 9,968,106 B2
(45) Date of Patent: May 15, 2018

(54) YOGURT TOPPING

(75) Inventor: Shri K. Sharma, Amherst, NY (US)

(73) Assignee: Rich Products Corporation, Buffalo, NY (US)

(*) Notice: Subject to any disclaimer, the term of this patent is extended or adjusted under 35 U.S.C. 154(b) by 232 days.

(21) Appl. No.: 12/969,777

(22) Filed: Dec. 16, 2010

(65) Prior Publication Data

US 2011/0151057 A1    Jun. 23, 2011

Related U.S. Application Data

(60) Provisional application No. 61/287,319, filed on Dec. 17, 2009.

(51) Int. Cl.
| A23C 9/123 | (2006.01) |
| A23C 13/12 | (2006.01) |
| A23C 9/13 | (2006.01) |
| A23C 9/137 | (2006.01) |
| A23G 3/52 | (2006.01) |
| A23G 9/20 | (2006.01) |
| A23G 3/34 | (2006.01) |

(52) U.S. Cl.
CPC ............ *A23C 9/123* (2013.01); *A23C 9/1307* (2013.01); *A23C 9/137* (2013.01); *A23C 9/1315* (2013.01); *A23G 3/343* (2013.01); *A23G 3/52* (2013.01); *A23G 9/20* (2013.01); *A23C 2240/10* (2013.01); *A23C 2260/152* (2013.01); *A23V 2002/00* (2013.01)

(58) Field of Classification Search
USPC ................. 426/34, 564, 565, 570, 572, 660
See application file for complete search history.

(56) References Cited

U.S. PATENT DOCUMENTS

| 3,963,836 | A | | 6/1976 | Henson et al. |
| 4,146,652 | A | * | 3/1979 | Kahn et al. .................... 426/564 |
| 4,451,492 | A | | 5/1984 | Dell et al. |
| 4,647,465 | A | | 3/1987 | van de Ven et al. |
| 5,238,696 | A | * | 8/1993 | Fuisz .............................. 426/565 |
| 6,203,841 | B1 | * | 3/2001 | Lynch et al. ................... 426/564 |
| 6,372,280 | B1 | * | 4/2002 | Gonsalves et al. ............ 426/564 |
| 7,011,861 | B2 | | 3/2006 | Nair et al. |
| 7,572,473 | B2 | | 8/2009 | Gutknecht et al. |
| 2002/0119238 | A1 | * | 8/2002 | Pires .............................. 426/602 |
| 2002/0122864 | A1 | * | 9/2002 | Baensch et al. ............... 426/580 |
| 2005/0084565 | A1 | * | 4/2005 | Gutknecht et al. ............. 426/36 |
| 2008/0085353 | A1 | * | 4/2008 | Piatko et al. .................. 426/572 |
| 2008/0280004 | A1 | | 11/2008 | Hillden et al. |
| 2009/0074932 | A1 | * | 3/2009 | Swan et al. .................... 426/522 |
| 2009/0311378 | A1 | | 12/2009 | Wilaschin et al. |
| 2009/0324773 | A1 | | 12/2009 | Peterson et al. |

OTHER PUBLICATIONS

Igoe et al, Dictionary of Food Ingredients 3rd Edition, pp. 30, 31, 69-70, 84, and 154, Chapman and Hall 1996.*
USDA pp. 1-2, Nutrient data for 01117, Yoghurt, plain, low fat, 12 grams protein per 8 ounces, printed Jun. 13, 2012. http://ndb.nal.usda.gov/ndb/foods/show/105?qlookup=01117&fg=&format=&man=&Ifacet=&max=25&new=1.*
Hannahactually "Cool Whip Fruit Dip", Food.com pp. 1-2, Jun. 2005 http://www.food.com/recipe/cool-whip-fruit-dip-128303.*
Bentley "The Incredible Health Benefits to You of Traditionally Fermented Foods" Mercola.com pp. 1-4, Jan. 2004 http://articles.mercola.com/sites/articles/archive/2004/01/03/fermented-foods-part-two.aspx.*
Titus "Need fluffy cool-whippy pie recipes for graham cracker crust" cooking, pp. 1-5, Jun. 2003 through May 2004 http://openforums.titus2.com/forums/t/2007/.*
USDA National Nutrient Database for Standard Reference, Basic Reports 43261, 01116, 01120, and 42135 pp. 1-4 http://ndb.nal.usda.gov/ndb/foods printed Jul. 30, 2014.*
Maggie "The Benefits of Yogurt" pp. 1-7, Mar. 2007 http://www.webmd.com/diet/features/benefits-of-yogurt.*
USDA Basic Reports 19351, 19350, and 19349 printed Jan. 25, 2015, pp. 1-3 http://ndb.nal.usda.gov/ndb/.*
FDA Food Facts, pp. 1-5 http://www.fda.gov/Food/ResourcesForYou/Consumers/ucm253954.htm printed Jan. 23, 2015.*
How "Yogurt" How Products are Made vol. 4, Dec. 9, 2008 http://www.madehow.com/Volume-4/Yogurt.html, pp. 1-5.*

* cited by examiner

*Primary Examiner* — Kelly Bekker
(74) *Attorney, Agent, or Firm* — Fay Sharpe LLP

(57) ABSTRACT

Provided herein are whippable topping compositions comprising yogurt. The compositions comprise a blend of yogurt and a whip topping emulsion. The yogurt can be made with regular, low fat or fat free milk. The fat content of the whip topping emulsion can also be varied to provide topping compositions of various fat content having a smooth texture and desirable consistency.

63 Claims, No Drawings

YOGURT TOPPING

CROSS REFERENCE TO RELATED APPLICATIONS

This application claims priority to U.S. provisional application No. 61/287,319, filed on Dec. 17, 2009, the disclosure of which is incorporated herein by reference.

BACKGROUND OF THE INVENTION

Whippable food products are commonly used as toppings, icings, fillings and the like for cakes and other desserts. Different approaches have been used to obtain formulations that possess desirable texture, organoleptic properties, shelf life, whippability and the like.

Yogurt is a product that has a completely different consistency than whippable toppings and icings. It also has a fundamentally different taste. Yogurt is not typically used as a topping and is not whippable. Thus, the nutritional benefits provided by yogurt are not available in current whippable toppings and icings.

SUMMARY OF THE INVENTION

The present invention provides yogurt-based compositions, which can be used as toppings on cakes and other desserts. The formulations are whippable and have a smooth texture and desirable consistency. The invention is based on the surprising observation that yogurt-based topping formulations can be prepared by a two-step process in which the yogurt and a whip topping emulsion are separately prepared and then combined such that microflora of the yogurt are maintained. In one embodiment, greater than 90% of the microflora are maintained. In various embodiments, greater than 95, 96, 97, 98 or 99% of the microflora are maintained. It is important to use a whip topping emulsion formulation having low or no protein so that curdling of protein in the presence of yogurt is avoided. In the process of the present invention, whip topping emulsion and yogurt are blended at low temperature (any temperature from 3° C. to 15° C.). The whip topping emulsion comprises fat, sweetener, emulsifier, stabilizer, water and optionally, protein and other additives such as coloring and flavoring agents.

The blended yogurt topping formulation can be frozen for longer shelf life (at least up to one year) and upon thawing can be whipped for use as a whipped topping. The formulation can also be frozen after whipping.

DESCRIPTION OF THE INVENTION

Unless indicated otherwise, all percentages herein are weight percentages.

The present invention provides yogurt-based compositions. These compositions comprise yogurt and whip topping emulsion. The compositions can be used as toppings on desserts and other food products such as cakes and the like.

The yogurt used in the present invention can be made from fat free, low fat or whole milk to produce yogurt toppings containing from 4 to 35% fat and all integers therebetween and all percentages to the tenth decimal point between all integers from 4 to 35. In one embodiment, the fat is less than 5.5% and therefore the topping can be labeled as fat free topping where such designation is acceptable. In one embodiment, the fat is 4 to 5.5%. In one embodiment, the fat is 10 to 15% and in another embodiment, the fat is 15 to 20, or 20 to 25%. In another embodiment, the fat is 25 to 30%. In one embodiment, the milk is fat free milk, 1% fat milk, 2% fat milk or regular whole milk (3.25 to 7.5% fat) from cow, goat or buffalo milk. The milk may be fresh or reconstituted to 10 to 20% total solids.

In one embodiment, the whip topping emulsion for mixing with the yogurt is an emulsion comprising fat, sweetener, emulsifier, syrup solids (e.g., corn syrup solids), stabilizer, water and optionally, protein, salt, color and flavor.

The fat component is dairy or non-dairy based. The fat should be able to whip the finished product to a desirable consistency which is firm in texture and holds up as dessert decoration without collapsing during handling, storage and distribution. When the fat (e.g., triglyceride) component is non-dairy fat, it comprises one or more vegetable fats including, palm kernel oil, coconut oil, palm oil, corn oil, sunflower oil, safflower oil or other vegetable oils or fractions thereof including stearine fractions. The fat component may be hydrogenated or non-hydrogenated. Although the product can be made with hydrogenated fats, it is desirable to use non-hydrogenated fats because it eliminates trans fats. The fat component can be from 8 to 40% and all integers therebetween. In one embodiment, the fat is from 8 to 14% for low fat whip topping emulsion and from 35 to 40% for regular whip topping emulsion and all integer values there between.

The emulsifiers in the whip topping emulsion are from 0.3 to 1.0% and all values to the tenth decimal place therebetween. Suitable emulsifiers include lecithin, hydrolyzed lecithin; mono, di, or polyglycerides of fatty acids, such as stearine and palmitin mono and diglycerides, polyoxyethylene ethers of fatty esters of polyhydric alcohols, such as the polyoxyethylene ethers of sorbitan monostearate (Polysorbate 60) or the polyoxyethylene ethers of sorbitan monooleate (Polysorbate 80); fatty esters of polyhydric alcohols such as sorbitan monostearate or tristearate; polyglycerol esters of mono and diglycerides such as hexaglyceryl distearate; mono- and/or diesters of glycols such as propylene glycol monostearate, and propylene glycol monopalmitate, succinoylated monoglycerides; and the esters of carboxylic acids such as lactic, citric, and tartaric acids with the mono- and diglycerides of fatty acids such as glycerol lacto palmitate and glycerol lacto stearate, and calcium or sodium stearoyl lactylates and all members of the sucrose ester family thereof, all varieties of diacetyltartaric esters of fatty acids, "DATEMS", and the like, and mixtures thereof.

The sweeteners useful for the present invention include sugars, monosaccharides, disaccharides, polysaccharides and the like. The sugars may be reducing or non-reducing sugars. The sugar component may comprise one or more sugars, such as sucrose, fructose, dextrose or trehalose. If a low sugar or sugar-free product is desired, then calorie free or low calorie sugar substitutes or intensive sweeteners can be used such as acesulfame, thaumatin aspartame, alitame, saccharin, cyclamates and trichloro sucrose. In that case, typically, bulking agents include maltodextrin and polyols such as polydextrose, maltitol, erythritol, xylitol, mannitol, isomalt, lactitol, glycerin, propylene glycol and sorbitol are also used. Sweeteners are used in the present composition from 10 to 20% and all integers therebetween.

The present whip topping emulsion also has syrup solids (e.g., corn syrup solids). The syrup solids are from 10 to 20% and all integers therebetween. Other syrup solids such as, for example, brown rice syrup, maple syrup, barley malt, evaporated cane syrup (Invert), honey, concentrated fruit sweeteners granulated cane sugar and the like may also be used. It is considered that these solids contribute to the bulk solids that help in building texture and providing sweet taste and flavor to the finished product.

Stabilizers useful for the present whip topping emulsion include, for example, various gums. These gums could be natural such as plant gums or animal gums. Useful gums for this invention include gelatins, pectins, alginates, agars, carrageenans, locust beans, guars, xanthans, gellans and konjac gums. In one embodiment, the gums can be xanthan gum and/or cellulosic hydrocolloids such as cellulose gums or gels, and/or carbohydrate gums. The cellulosic gums include methylcellulose, carboxy-methylcellulose, hydroxy-propylcellulose, hydroxy-propylmethylcellulose, and microcrystalline cellulose. The amount of the gums and stabilizers can be varied from 0.3 to 1.0% and all values to the tenth decimal place therebetween as permissible under FDA guidelines.

Protein is optional in the whip topping emulsion of the present invention. It is preferable to keep the protein at 1% or lower. In one embodiment, the non-dairy fat emulsion is protein-free. In another embodiment, the protein is less than 0.5%. In another embodiment, the protein is between 0.1 to 1.0% and all values to the tenth decimal place therebetween. When used, useful protein sources include soy and dairy such as isolated sodium, potassium or calcium caseinates, milk protein concentrates or isolates, whey protein concentrates or isolates, and soy protein.

The salts useful for the present invention are any edible salts that do not interfere with other ingredients or render an undesirable taste. It is considered that salts generally act as buffers and sequestrants. Examples of useful salts are common salt (sodium chloride), and sodium, calcium and potassium: monophosphates, diphosphates, polyphosphates, citrates, chlorides, and the like. Salts are generally used from 0.1 to 0.5% and all values to the tenth decimal point therebetween.

Other ingredients that are useful for the whip topping emulsion include flavoring agents, colorants, vitamins, minerals, etc. Suitable flavoring agents can be employed to impart vanilla, cream, chocolate, coffee, maple, spice, mint, butter, caramel, fruit and other flavors. Suitable amounts include 0.1 to 0.6% and all values to the tenth decimal place therebetween. Coloring agents can be added from 0.001 to 0.05% and all values to the thousandth place therebetween.

The process of the present invention involves obtaining or making yogurt. The yogurt preferably has more than 10% total solids. In one embodiment, the total solids in the yogurt are between 10 to 20% and all integers therebetween. In various embodiments, the total solids are 11, 12, 13, 14, 15, 16, 17, 18, 19 and 20%. In one embodiment, the yogurt has from 15 to 18% total solids. In one embodiment, the yogurt is free of, or has less than 0.1% of, gums or other stabilizing agents including pectin. Higher levels of these ingredients present in yogurt may impart sticky, adhesive or gummy texture to the finished product, which may be undesirable in the finished product.

For example, in one embodiment, the milk is pasteurized (such as at temperature 180 to 185° F.) for 5 min and then cooled to 105-110° F. Live probiotic yogurt culture (e.g., 0.01 to 0.02%) is added to the batch and the cultured milk is incubated at 105° F. for 3 to 4 hours for making yogurt. The final yogurt pH is 4.4 to 4.6. The yogurt is refrigerated overnight for cooling down to 40 to 45° F. The yogurt can be made from fat free milk (skim milk), 1% or 2% fat milk or regular fat milk.

Separately, a whip topping emulsion is prepared by mixing the various ingredients. For example, the whip topping emulsion is made using standard procedure of heating and mixing of fat, water, sugar, emulsifier, stabilizer, optionally, protein, salt, flavor and color. The heated mixture is properly homogenized and cooled (such as through plate heat exchanger) below 45° F. to obtain stable emulsion, which can be stored in a holding tank at cooled temperatures at 42 to 47° F.

The whip topping emulsion and yogurt are blended in various ratios to obtain a yogurt topping that has a desired consistency and is whippable. For example, a ratio of 2.5 to 1.0 parts of whip topping emulsion to 1 to 2.5 parts of yogurt including all ratios therebetween to obtain regular, low fat and fat free yogurt topping at low temperature (45-50° F.). In one embodiment, a ratio of 1.4:1 to 2.5:1 for whip topping emulsion to yogurt for regular fat yogurt topping (20-25% fat); 1:1.35 to 1:2.5 for low fat (10-15% fat) and 1:1.4 for fat free yogurt topping was used. Blending of the whip topping emulsion and yogurt is, preferably, carried out at low temperatures (3° C. to 15° C. or any integer therebetween). In one embodiment, the whip topping emulsion and yogurt are blended at 3 to 7° C. to obtain a yogurt topping. It is preferable not to use temperatures above 15° C. as it may affect the crystal morphology of the whip topping emulsion, which adversely affects its whipping quality and performance. Because the process is carried out at low temperatures, the inactivation of probiotic cultures is avoided, which otherwise occurs at batch pasteurization temperatures of 145° F. or higher. In one embodiment, the yogurt topping is able to maintain at least $2\times10^6$ cfu per gram after incubation of 10 to 12 hrs at physiological temperature (37° C.).

The blended mixture is cooled to temperature (e.g., 3 to 10° C.) and can be frozen such that the mixture exhibits a shelf life of up to one year. The frozen and thawed product can be whipped on a mixer to obtain yogurt toppings of fat content from 4 to 35%. The yogurt toppings can have a fat content of less than 5%, from 5 to 10%, from 10 to 15%, from 15 to 20%, from 20 to 25%, from 25 to 30% and from 30 to 35%. The yogurt toppings have desirable consistency and smooth texture with 250-350% overrun and can be used as a topping on food products. The formulation has smooth shiny appearance with little or no air cell coalescence within its texture. It has firm texture and consistency such that it holds itself if turned into rosettes, flowers or animal shapes when decorating the cakes. Another yogurt product, yogurt ice-cream, does not provide those characteristics so as to be useful for decoration of cake at refrigeration or ambient temperature.

In one embodiment, the method comprises the step(s) of blending the whip topping emulsion and yogurt to make a whippable food product, and optionally, cooling the whippable food product and/or aging the whippable food product and/or whipping the whippable food product and/or freezing the whippable food product and/or whipping the thawed whippable food product. In one embodiment, the method consists essentially of the step(s) of blending the whip topping emulsion and yogurt to make a whippable food product, and optionally, cooling the whippable food product and/or aging the whippable food product and/or whipping the whippable food product and/or freezing the whippable food product and/or whipping the thawed whippable food product. In one embodiment, the method consists of the step(s) of blending the whip topping emulsion and yogurt to make a whippable food product, and optionally, cooling the whippable food product and/or aging the whippable food product and/or whipping the whippable food product and/or freezing the whippable food product and/or whipping the thawed whippable food product.

In one embodiment, the mixture is whipped to an overrun of 250 to 400%. In another embodiment, the mixture is whipped to an overrun of 250 to 300%. In another embodiment, the mixture is whipped to an overrun of 270 to 400%.

The blended yogurt and whip topping emulsion can be frozen (e.g., in a freezer) for long-term storage, if needed. The frozen yogurt topping is thawed (e.g., for 12-24 hours) in the refrigerator (such as at 40-45° F.) before whipping in a mixer to obtain yogurt topping. The finished whipped product is stable on the decorated cake and in the bowl at refrigerated temperature for up to 5 days. The finished dessert with the topping (such as a cake) can be frozen for longer shelf life.

In an alternative embodiment, the yogurt topping is aged for some time (e.g., 4-8 hrs at low 5-7° C.) and then frozen or whipped (such as by whipping on a batch or continuous mixer) so as to make pre-whipped yogurt topping. The pre-whipped product can be filled in pastry bags or bowls and then frozen for up to one year.

In one embodiment, the present invention provides a composition comprising a mixture of yogurt and whip topping emulsion described herein. In another embodiment, the present invention provides a composition prepared by the methods described herein.

Example 1

Materials & Methods

Regular fat and low fat yogurt topping was prepared by blending a portion of protein-less non-dairy topping (containing 35-40% fat) with yogurt. Thus, in one embodiment, the protein-less whip topping emulsion was mixed in the ratios shown in the table below. In various experiments, the yogurt was made with fat free, 2% fat or regular milk so that final finished product contained 21-24% fat and 13-16% fat, respectively. In one example, we used 35% fat protein-less topping for regular and low fat toppings. A 2:1 ratio for regular fat (440 g of topping+220 g of regular yogurt) resulted in 23-24% fat. Blending 260 g of topping with 400 g of regular yogurt gave a 14.5% fat (low fat) topping.

TABLE 1

The ratios of whip topping emulsion to yogurt in various fat percentage yogurt toppings.

| | whip topping emulsion wt | Yogurt wt | Ratio whip topping emulsion:yogurt wt | Protein from 15% total solids Yogurt, % | Protein from Skim Milk yogurt (9% solids) |
|---|---|---|---|---|---|
| Yogurt Topping 20% fat | 380 | 280 | 1.35:1 | 2.23 | 1.34 |
| Yogurt Topping 25% fat | 470 | 190 | 2.47:1 | 1.51 | 0.91 |
| Yogurt Topping 10% Fat | 188 | 472 | 1:2.5 | 3.75 | 2.25 |
| Yogurt Topping 15% Fat | 282 | 378 | 1:1.34 | 3.01 | 1.80 |
| Yogurt Topping 5% fat | 275 | 385 | 1:1.4 | 3.31 | 1.99 |

* In 25, 20 and 10% fat toppings, the 35% whip topping emulsion was used for the blend and in 5% fat topping, we used 12% whip topping emulsion for the blend The composition of the protein-less whip topping emulsion is shown in Table 1.

TABLE 1

The composition of Regular Fat whip topping emulsion

| Ingredients, % | % Range for Ingredients | Preferred Range |
|---|---|---|
| Water | 40-55% | 45-50% |
| Fat | 35-40% | 30-8% |
| Emulsifier | 0.3-1.0% | 0.2-0.4% |
| Sweetener | 10-20% | 12-18% |
| Corn syrup solids | 10-20% | 12-18% |
| Stabilizer | 0.3-1.0 | 0.4-0.8% |

TABLE 2

The composition of Low Fat whip topping emulsion

| Ingredients, % | % Range for Ingredients | Preferred Range |
|---|---|---|
| Water | 40-60% | 45-55% |
| Fat | 8-14% | 10-12% |
| Protein | 0-1.0% | 0.6-0.8% |
| Emulsifier | 0.3-1.0% | 0.2-0.4% |
| Sweetener | 10-20% | 12-18% |
| Corn syrup solids | 15-25% | 18-22% |
| Stabilizer | 0.3-1.0 | 0.4-0.8% |

TABLE 3

Whip topping emulsion with 35% fat

| Ingredients | Percentage |
|---|---|
| Water | 43.89 |
| Beta-Carotene (Color) | 0.002 |
| Rosemary Flavor | 0.004 |
| Polysorbate 60 | 0.30 |
| Polyglycerol Esters | 0.14 |
| Salt | 0.20 |
| Sodium Citrate | 0.10 |
| Disodium phosphate | 0.10 |
| Sugar | 19.60 |
| Hydroxypropyl Methyl Cellulose | 0.40 |
| Palm Kernel Oil | 35.00 |
| Lecithin | 0.100 |
| Flavor vanilla | 0.150 |
| Flavor Cream | 0.015 |
| Total | 100.000 |
| Total Solids, % | 56.11 |

TABLE 4

Whip topping emulsion with 12% fat

| Ingredients | Percentage |
|---|---|
| Stearin Fraction Palm Kernel Oil | 12.00 |
| Sodium Stearoyl Lactilate | 0.4600 |
| Sugar | 12.800 |
| Corn Syrup Solids | 22.70 |
| Sodium Caseinate | 0.6000 |
| Methyl Cellulose | 0.4000 |
| Dipotassium hydrogen Phosphate | 0.1200 |
| Salt | 0.1000 |
| Xanthan Gum | 0.0400 |

TABLE 4-continued

Whip topping emulsion with 12% fat

| Ingredients | Percentage |
|---|---|
| Flavor cream | 0.2000 |
| Water | 50.60 |
| Total | 100.00 |
| Total Solids, % | 49.40 |

Salt, color and flavor are optional and when used, can be used in the range of 0.1 to 0.5%, 0.001 to 0.05% and 0.1 to 0.6% respectively. In one embodiment, salt, color and flavor are in the range of 0.2 to 0.4%, 0.01 to 0.03%, and 0.1 to 0.6% respectively.

For making fat free yogurt topping (4 to 5% fat), it is preferred to make low fat whip topping emulsion with fully hydrogenated vegetable oil. However, the topping may or may not contain some protein in the finished product. For example, in one embodiment, a topping with special stearin fractionated palm kernel oil containing 12% fat and 0.6% protein was used. It was blended in the ratio of 42% of topping to 58% of yogurt (275 g of topping+385 g of yogurt) resulting in 5% fat in the final product.

The composition of low fat topping used for making fat free yogurt topping is shown in Table 2.

In one embodiment, the yogurt making process was as follows:
1. Regular fat, 2% fat, skim milk (9%, total solids) or reconstituted skim milk (15% total solids) was heated to 80 to 85° C. and held for 5 minutes.
2. The heated milk was cooled down to 41 to 45° C.
3. It was inoculated with 0.01% freeze dried yogurt culture (Danisco Yo Mix—511) and mixed well.
4. The milk was incubated at 41 to 43° C. for 4 to 5 hours for yogurt fermentation. Once the fermented yogurt milk pH dropped to 4.4 to 4.6, the product was stored at refrigeration temperature (5 to 8° C.) until further use for making yogurt topping.

Blending Whip Topping Emulsion with Fermented Yogurt:

Whip topping emulsion was blended with fermented yogurt in various ratios as shown in Table 3 to make regular fat, low fat and fat free yogurt topping. Fat free yogurt topping as used herein means topping having 5% or less fat (can be as low as 1%). Thus, to obtain low fat yogurt topping, the amount of yogurt and the non-dairy topping can be adjusted to as to keep the total fat to 5% or less.

In a variation of this formulation, the yogurt topping were made with added stanol esters and sterol esters (Corowise, SEC 101) to give 0.6 g of sterol esters per 9 g serving size. The topping containing stanol/sterol esters help lower the cholesterol and are considered good for the health. In another case, the non-dairy topping were made by using non-hydrogenated vegetable oil and thus finished product had no trans fat.

TABLE 5

Ratio of blending whip topping emulsion and yogurt before freezing:

| Yogurt Topping | Whip topping emulsion | Yogurt | Total |
|---|---|---|---|
| Regular Fat Yogurt Topping | 55-70% | 30-45% | 100 |
| Low Fat Yogurt Topping | 40-50% | 50-60% | 100 |
| Fat Free Yogurt Topping | 40-42% | 58-60% | 100 |

\* In Regular and Low Fat toppings, the 35% fat topping was used for the blend
\*\* In Fat Free Topping, we used 12% fat topping for the blend In the above table, all values within the indicated ranges of values are included. Thus, for example, when a range of 55-70% is provided, then all values (integers as well as to the tenth decimal place) from 55 to 70 are included.

Whipping

The blended yogurt product was either refrigerated or frozen. The product can be frozen for up to 365 days at −18° C. The refrigerated product was whipped on Hobart or Kitchen Aid mixer. The frozen product was thawed at refrigeration temperature (5 to 7° C.) for up to 24 hours before whipping for getting best results. The product may also be whipped on a continuous mixer for large volume. The yogurt topping may be whipped prior to freezing.

Results:

The whipped product was evaluated for whipping time, % over run, rosette time or bag time. The product was used for decorating the cakes and its stability was evaluated in terms of cracking, bulging and bubbling. Some product was stored in the refrigerated bowl and it was evaluated for change in air cell coalescence, serum separation (syneresis) and cracking. A summary of the yogurt topping evaluation results is shown in Table 6.

TABLE 6

Evaluation results summary of Yogurt Toppings

| Products | Whip Time, min | % Over run | Rosette Time, min | Sensory | Stability of Cake | Stability in Bowl |
|---|---|---|---|---|---|---|
| 1. Regular Yogurt Topping (20-25% fat) | 6:00-9:00 | 300-360% | 25-40 | Smooth, texture, good yogurt taste and flavor | Good | Good |
| 2. Low Fat Yogurt Topping (10-15% fat) | 5:00-8:00 min | 270-330 | 25-35 | Smooth, good taste & flavor | Good | Good |
| 3. Fat Free Yogurt Topping (4-5.5% fat) | 10:00-14:00 | 280-320% | 20-30 | Smooth, slightly soft in texture, good yogurt flavor | Good | Good |

TABLE 6-continued

Evaluation results summary of Yogurt Toppings

| Products | Whip Time, min | % Over run | Rosette Time, min | Sensory | Stability of Cake | Stability in Bowl |
|---|---|---|---|---|---|---|
| 4. Yogurt Topping with Sterol Esters (Regular or low fat) | 5:00-7:00 | 360-390 | Good, no after taste | Slightly soft texture | Good | Good |
| 5. Yogurt topping with no trans fat Regular or low fat | 6:00-8:00 | 380-400 | Good taste and flavor | Smooth | Good | Good |

The results were as follows:

Yogurt toppings (Regular, low fat and free fat) had good taste, texture and dairy yogurt flavor. All samples had good % overrun (270-400%) and the whipped samples were stable in the bowl for up to 24-48 hours. The cakes decorated with whipped yogurt topping had good stability with shelf life up to 5-7 days.

Yogurt containing sterol esters also had good % overrun, taste and flavor with slightly soft texture Yogurt topping with non-hydrogenated vegetable oil also had smooth texture, good taste & flavor with acceptable whipping performance.

While the present invention has been described through specific embodiments and examples, routine modifications to these embodiments will be apparent to those skilled in the art and such modifications are intended to be included in the scope of the present invention.

The invention claimed is:

1. A method for making a whipped yogurt-based food product having an overrun of at least 250% and which whipped yogurt-based food product is stable in said whipped form while maintaining said overrun of at least 250% for at least 24 hours in refrigerated temperatures, said method comprising the steps of blending yogurt with a whip topping emulsion to form a blended yogurt and whipped topping emulsion, said whip topping emulsion comprising 8 to 40 wt % fat, 0.4 to 1.0 wt % emulsifier, 10 to 20 wt % sweetener that are absent syrup solids, 10 to less than 25 wt % syrup solids, 0.3 to 1.0 wt % stabilizer, 40-60 wt % water, and less than 0.5 wt % protein, said yogurt having an acidic pH, said pH of said yogurt is about 4.4-4.6, said blended yogurt and whip topping emulsion blended under conditions such that the over 90% of the microflora of said yogurt is not destroyed, said blended yogurt and whip topping emulsion formulated such that said blended yogurt and whip topping emulsion can be subsequently whipped together to form said whipped yogurt-based food product having an overrun of at least 250% and is stable in a whipped form with said overrun of at least 250% for at least 24 hours in refrigerated temperatures, said yogurt and said whip topping emulsion mixed together at a ratio of 2.5 to 1 parts whip topping emulsion to 1 to 2.5 parts yogurt, said blended yogurt and whip topping emulsion whipped together in a non-frozen state and at a refrigerated temperature to form said whipped yogurt-based food product having an overrun of at least 250%, said whipped yogurt-based food product including protein.

2. The method of claim 1, wherein the whip topping emulsion and the yogurt are blended at a ratio of 1.35:1 to 1:1.35.

3. The method of claim 1, wherein the yogurt is made with regular fat milk, 2 wt % fat milk, 1 wt % fat milk or skim milk.

4. The method of claim 1, wherein the whip topping emulsion comprises 35 to 40 wt % fat.

5. The method of claim 1, wherein the whip topping emulsion comprises 8 to 14 wt % fat.

6. The method of claim 1, wherein the whip topping emulsion comprises 0.1 wt. % to less than 0.5 wt % protein, 12 to 18 wt % sugar, 12 to 18 wt % corn syrup solids, and 0.4 to 0.8 wt % stabilizers.

7. The method of claim 1, wherein the whip topping emulsion is protein free.

8. The method of claim 1, wherein the total solids in the yogurt are 15 to 18 wt %.

9. The method of claim 1, wherein the fat is vegetable fat.

10. The method of claim 1, wherein the fat is selected from the group consisting of palm kernel oil, palm oil, coconut oil, soybean oil, corn oil and sunflower oil.

11. The method of claim 1, wherein the syrup solids is corn syrup solids.

12. The method of claim 1, further comprising the steps of i) freezing the blended yogurt and whip topping emulsion prior to said step of whipping said blended yogurt and whip topping emulsion, ii) thawing said blended yogurt and whip topping emulsion after said freezing step and iii) whipping said blended yogurt and whip topping emulsion after said step of thawing said blended yogurt and whip topping emulsion.

13. The method of claim 1, further comprising the step of freezing said whipped yogurt-based food product.

14. A whipped product prepared from the food product of claim 1.

15. A confection comprising the whipped product of claim 14.

16. The confection of claim 15, wherein the confection is a dessert and said whipped product is a topping for said dessert.

17. The confection of claim 16, wherein the dessert is a cake, cookie, pastry, ice-cream cake, cheese cake, eclair or cream puff.

18. A method for making a whipped yogurt-based food product having an overrun of at least 250% and whipped yogurt-based food product is stable in said whipped form while maintaining said overrun of at least 250% for at least 24 hours in temperatures of no less than 5° C., said method comprising:

forming a whip topping emulsion, said whip topping emulsion comprising 8 to 40 wt % fat, 0.3 to 1% emulsifier, 10 to 20 wt % sweetener that are absent syrup solids, 10 to 25 wt % syrup solids, 0.3 to 1 wt % stabilizer, 40 to 60 wt % water, and up to 1 wt % protein;

providing yogurt, said yogurt including microflora;

combining said whip topping emulsion and said yogurt at a ratio of 2.5 to 1 parts whip topping emulsion to 1 to 2.5 parts yogurt to form a blended food product, said combination of said whip topping emulsion and said yogurt constituting 100 wt % of said yogurt-based food product; and, whipping together said blended food product while said blended food product is in a non-frozen state and at a temperature of no less than 3° C., said blended food product whipped together to form said whipped yogurt-based food product having an overrun of at least 250%;

wherein greater than 90% of said microflora of said yogurt in said blended food product is not destroyed, said whipped yogurt-based food product is stable in a whipped form with said overrun value of at least 250% for at least 24 hours at a temperature of no less than 5° C.

19. The method as defined in claim 18, wherein said overrun of said whipped yogurt-based food product is 270-400%.

20. The method as defined in claim 18, further including the steps of i) freezing said blended food product prior to said whipping step, ii) thawing said frozen blended food product, and iii) said step of whipping said blended food product in said thawed state to form said whipped yogurt-based food product occurring after said step of thawing.

21. The method as defined in claim 19, further including the steps of i) freezing said blended food product prior to said whipping step, ii) thawing said frozen blended food product, and iii) said step of whipping said blended food product in said thawed state to form said whipped yogurt-based food product occurring after said step of thawing.

22. The method as defined in claim 18, wherein said whip topping emulsion has a protein content of less than 0.5 wt %.

23. The method as defined in claim 21, wherein said whip topping emulsion has a protein content of less than 0.5 wt %.

24. The method as defined in claim 18, wherein said whip topping emulsion and said yogurt are combined at a ratio of 1.4 to 1 parts whip topping emulsion to 1 to 2.5 parts yogurt to form said blended food product, said whip topping emulsion comprising 35 to 40 wt % fat, 0.3 to 1 wt % emulsifiers, 10 to 20 wt % sweetener, 10 to 20 wt % syrup solids, 0.3 to 1 wt % stabilizers, and 40 to 55 wt % water.

25. The method as defined in claim 23, wherein said whip topping emulsion and said yogurt are combined at a ratio of 1.4 to 1 parts whip topping emulsion to 1 to 2.5 parts yogurt to form said blended food product, said whip topping emulsion comprising 35 to 40 wt % fat, 0.3 to 1 wt % emulsifiers, 10 to 20 wt % sweetener, 10 to 20 wt % syrup solids, 0.3 to 1 wt % stabilizers, and 40 to 55 wt % water.

26. The method as defined in claim 23, wherein said whip topping emulsion comprising up to 38% fat, 12 to 18 wt % sweetener, 12 to 18 wt % syrup solids, 0.4 to 0.8 wt % stabilizers, and 45 to 50 wt % water.

27. The method as defined in claim 18, wherein said whip topping emulsion and said yogurt are combined at a ratio of 1.35 to 1 parts whip topping emulsion to 1 to 2.5 parts yogurt to form said blended food product, said whip topping emulsion comprising 8 to 14 wt % fat, 0.3 to 1 wt % emulsifiers, 10 to 20 wt % sweetener, 10 to 25 wt % syrup solids, 0.3 to 1 wt % stabilizers, and 40 to 60 wt % water.

28. The method as defined in claim 23, wherein said whip topping emulsion and said yogurt are combined at a ratio of 1.35 to 1 parts whip topping emulsion to 1 to 2.5 parts yogurt to form said blended food product, said whip topping emulsion comprising 8 to 14 wt % fat, 0.3 to 1 wt % emulsifiers, 10 to 20 wt % sweetener, 10 to 25 wt % syrup solids, 0.3 to 1 wt % stabilizers, and 40 to 60 wt % water.

29. The method as defined in claim 28, wherein said whip topping emulsion comprising 10 to 12 wt % fat, 12 to 18 wt % sweetener, 18 to 22 wt % syrup solids, 0.4 to 0.8 wt % stabilizers, and 45 to 55 wt % water.

30. The method as defined in claim 18, further including the steps of i) freezing said whipped yogurt-based food product, and ii) thawing said frozen whipped yogurt-based food product.

31. The method as defined in claim 1, wherein said step of combining said whip topping emulsion and said yogurt is at a temperature of 3-15° C.

32. The method as defined in claim 1, wherein said step of whipping said blended food product is at a temperature of 3-10° C.

33. The method as defined in claim 1, wherein said yogurt has a protein content of 0.91-3.75 wt %.

34. The method as defined in claim 18, wherein said step of combining said whip topping emulsion and said yogurt is at a temperature of 3-15° C.

35. The method as defined in claim 25, wherein said step of combining said whip topping emulsion and said yogurt is at a temperature of 3-15° C.

36. The method as defined in claim 26, wherein said step of combining said whip topping emulsion and said yogurt is at a temperature of 3-15° C.

37. The method as defined in claim 29, wherein said step of combining said whip topping emulsion and said yogurt is at a temperature of 3-15° C.

38. The method as defined in claim 18, wherein said step of whipping said blended food product is at a temperature of 3-10° C.

39. The method as defined in claim 35, wherein said step of whipping said blended food product is at a temperature of 3-10° C.

40. The method as defined in claim 36, wherein said step of whipping said blended food product is at a temperature of 3-10° C.

41. The method as defined in claim 37, wherein said step of whipping said blended food product is at a temperature of 3-10° C.

42. The method as defined in claim 18, wherein said whipped topping emulsion comprising in weight percent:
water 40-55%
fat 35-40%
emulsifier 0.3-1%
sweetener 10-20%
syrup solids 10-20%
stabilizer 0.3-1%.

43. The method as defined in claim 18, wherein said whipped topping emulsion comprising in weight percent:
water 45-50%
fat 35-38%
emulsifier 0.3-1%
sweetener 10-20%
syrup solids 10-20%
stabilizer 0.3-1%.

44. The method as defined in claim 18, wherein said whipped topping emulsion comprising in weight percent:
water 40-60%
fat 8-14%
protein 0-1%
emulsifier 0.3-1%
sweetener 10-20%
syrup solids 15-25%
stabilizer 0.3-1%.

45. The method as defined in claim 18, wherein said whipped topping emulsion comprising in weight percent:

water 45-55%
fat 10-12%
protein 0.6-0.8%
emulsifier up to 0.4%
sweetener 12-18%
syrup solids 18-22%
stabilizer 0.4-0.8%.

46. The method as defined in claim 18, wherein said yogurt has a protein content of 0.91-3.75 wt %.

47. A method for making a whipped yogurt-based food product having an overrun of at least 250% and is stable in a whipped form for at least 24 hours in refrigerated temperatures, said method comprising:
    forming a whip topping emulsion, said whip topping emulsion comprising 8 to 40 wt % fat, 0.4 to 1 wt % emulsifier, 10 to 20 wt % sweetener that are absent syrup solids, 10 to less than 25 wt % syrup solids, 0.3 to 1 wt % stabilizer, 40 to 60 wt % water, and less than 0.5 wt % protein;
    providing yogurt, said yogurt including microflora, said yogurt having a protein content of up to 3.75 wt % and a solids content of at least 10 wt %;
    combining said whip topping emulsion and said yogurt at a ratio of 2.5 to 1 parts whip topping emulsion to 1 to 2.5 parts yogurt to form a blended food product, said combination of said whip topping emulsion and said yogurt constituting 100 wt % of said yogurt-based food product; and,
    whipping together said blended food product while said blended food product is in a non-frozen state and at a temperature of no less than 3° C., said blended food product whipped together to form a whipped yogurt-based food product having an overrun of at least 250%;
    wherein greater than 90% of said microflora of said yogurt in said blended food product is not destroyed, said whipped yogurt-based food product is stable with said overrun value of at least 250% for at least 24 hours at a temperature of no less than 5° C., said whipped yogurt-based food product has a protein content of up to 2.964 wt %.

48. The method as defined in claim 47, wherein said emulsion comprising 10 to 12 wt % fat, 12 to 18 wt % sweetener, 18 to 22 wt % syrup solids, 0.4 to 0.8 wt % stabilizers, less than 0.5 wt % protein, and 45 to 55 wt % water, said yogurt consists essentially of milk, yogurt culture and less than 0.1 wt % stabilizer.

49. A method for making a yogurt-based food product, said method comprising:
    providing an emulsion, said emulsion comprising fat, emulsifier, sweetener, syrup solids, stabilizer and water, said fat having a content of 8 to 40 wt %, said emulsifier having a content of up to 1 wt %, said sweetener having a content of 10 to 20 wt %, said syrup solids having a content of 10 to less than 25 wt %, said stabilizer having a content of up to 1 wt %, said water having a content of 40 to 60 wt %, said emulsion including less than 0.5 wt % protein;
    providing yogurt, said yogurt including microflora, said yogurt having a protein content of at least 0.91 wt % and a solids content of at least 10 wt %; and,
    mixing said emulsion and said yogurt at a ratio of 3 to 1 parts emulsion to 1 to 3 parts yogurt to form a blended food product, said combination of said whip topping emulsion and said yogurt constituting 100 wt % of said yogurt-based food product, said step of mixing is at a temperature of 3-15° C., said blended food product formulated to be capable of being whipped in a non-frozen state and at a temperature of no less than 3° C. to form a whipped food product having an overrun of at least 250 for at least 24 hours at a temperature of no less than 5° C., said blended food product blended such that greater than 90% of said microflora of said yogurt is not destroyed.

50. The method as defined in claim 49, further including the step of whipping said blended food product to form a whipped product, said step of whipping occurring at a temperature of no less than 3° C., said blended food product in a non-frozen state prior to and during said step of whipping, said whipped product having an overrun of at least 250% and is stable in said whipped form while maintaining said overrun of at least 250% for at least 24 hours in refrigerated temperatures, said whipped product has a protein content of up to 2.964 wt %.

51. The method as defined in claim 49, further including the step of freezing said blended food product.

52. The method as defined in claim 51, further including the steps of i) thawing said frozen blended food product, and ii) whipping said thawed blended food product to form a whipped product, said step of whipping occurring at a temperature of no less than 3° C., said blended food product in a non-frozen state prior to and during said step of whipping, said whipped product having an overrun of at least 250% and is stable in said whipped form while maintaining said overrun of at least 250% for at least 24 hours in refrigerated temperatures, said whipped product has a protein content of up to 2.964 wt %.

53. The method as defined in claim 49, wherein said emulsion comprising 10 to 12% fat, 12 to 18 wt % sweetener, 18 to 22 wt % syrup solids, 0.4 to 0.8 wt % stabilizers, and 45 to 55 wt % water, said yogurt consists essentially of milk, yogurt culture and less than 0.1 wt % stabilizer.

54. The method as defined in claim 50, wherein said emulsion comprising 10 to 12% fat, 12 to 18 wt % sweetener, 18 to 22 wt % syrup solids, 0.4 to 0.8 wt % stabilizers, and 45 to 55 wt % water, said yogurt consists essentially of milk, yogurt culture and less than 0.1 wt % stabilizer.

55. The method as defined in claim 51, wherein said emulsion comprising 10 to 12 wt % fat, 12 to 18 wt % sweetener, 18 to 22 wt % syrup solids, 0.4 to 0.8 wt % stabilizers, and 45 to 55 wt % water, said yogurt consists essentially of milk, yogurt culture and less than 0.1 wt % stabilizer.

56. The method as defined in claim 52, wherein said emulsion comprising 10 to 12 wt % fat, 12 to 18 wt % sweetener, 18 to 22 wt % syrup solids, 0.4 to 0.8 wt % stabilizers, and 45 to 55 wt % water, said yogurt consists essentially of milk, yogurt culture and less than 0.1 wt % stabilizer.

57. The method as defined in claim 50, wherein said whipped product is a topping for use on cakes and other desserts.

58. The method as defined in claim 49, wherein said emulsifier content in said emulsion is 0.3 wt % to 1 wt % and said stabilizer content in said emulsion is 0.3 wt % to 1 wt %.

59. The method as defined in claim 50, wherein said emulsifier content in said emulsion is 0.3 wt % to 1 wt % and said stabilizer content in said emulsion is 0.3 wt % to 1 wt %.

60. The method as defined in claim 52, wherein said emulsifier content in said emulsion is 0.3 wt % to 1 wt % and said stabilizer content in said emulsion is 0.3 wt % to 1 wt %.

61. The method as defined in claim 49, wherein said whipped topping emulsion consists essentially of in weight percent:
  water 40-55%
  fat 35-40%
  emulsifier 0.3-1%
  sweetener 10-20%
  syrup solids 10-20%
  stabilizer 0.3-1%
  protein 0-less than 0.5%
  salt 0-0.5%
  color 0-0.05%
  flavor 0-0.6%.

62. The method as defined in claim 49, wherein said whipped topping emulsion consists essentially of in weight percent:
  water 40-60%
  fat 8-14%
  emulsifier 0.3-1%
  sweetener 10-20%
  syrup solids 15% to less than 25%
  stabilizer 0.3-1%
  protein 0-less than 0.5%
  salt 0.1-0.5%
  color 0-0.05%
  flavor 0-0.6%.

63. The method as defined in claim 49, wherein said whipped topping emulsion consists essentially of in weight percent:
  water 45-55%
  fat 10-12%
  emulsifier up to 0.4%
  sweetener 12-18%
  syrup solids 18-22%
  stabilizer 0.4-0.8%
  protein 0-less than 0.5%
  salt 0.1-0.5%
  color 0-0.05%
  flavor 0-0.6%.

* * * * *